(12) United States Patent
Ooghe et al.

(10) Patent No.: US 8,867,542 B2
(45) Date of Patent: Oct. 21, 2014

(54) METHOD AND APPARATUS FOR CONNECTING SUBSCRIBER DEVICES TO AN IPV6-CAPABLE AGGREGATION NETWORK

(75) Inventors: Sven Ooghe, Gentbrugge (BE); Ludwig Pauwels, Beveren (BE)

(73) Assignee: Alcatel Lucent, Boulogne-Billancourt (FR)

( * ) Notice: Subject to any disclaimer, the term of this patent is extended or adjusted under 35 U.S.C. 154(b) by 143 days.

(21) Appl. No.: 13/262,763

(22) PCT Filed: Apr. 13, 2010

(86) PCT No.: PCT/EP2010/054814
§ 371 (c)(1),
(2), (4) Date: Nov. 29, 2011

(87) PCT Pub. No.: WO2010/121921
PCT Pub. Date: Oct. 28, 2010

(65) Prior Publication Data
US 2012/0128001 A1    May 24, 2012

(30) Foreign Application Priority Data
Apr. 20, 2009  (EP) .................................... 09290290

(51) Int. Cl.
*H04L 12/28* (2006.01)
*H04L 29/12* (2006.01)
*H04L 29/06* (2006.01)

(52) U.S. Cl.
CPC ...... *H04L 29/12264* (2013.01); *H04L 61/2503* (2013.01); *H04L 61/6059* (2013.01); *H04L 69/167* (2013.01); *H04L 29/12339* (2013.01); *H04L 29/12915* (2013.01); *H04L 69/16* (2013.01); *H04L 61/2046* (2013.01)
USPC ............................ 370/392; 370/401; 370/475

(58) Field of Classification Search
USPC ............ 370/400, 401, 465–467, 475; 726/11, 726/12
See application file for complete search history.

(56) References Cited

U.S. PATENT DOCUMENTS

| | | |
|---|---|---|
| 2006/0280192 A1 | 12/2006 | Desanti |
| 2008/0205401 A1 | 8/2008 | Mirtorabi et al. |
| 2008/0244090 A1 | 10/2008 | Zhu et al. |

OTHER PUBLICATIONS

Narten et al., RFC 2461—Neighbor Discovery for IP Version 6 (IPv6), Dec. 1998, pp. 17-26.*

* cited by examiner

*Primary Examiner* — Pao Sinkantarakorn
(74) *Attorney, Agent, or Firm* — Harness, Dickey and Pierce

(57) ABSTRACT

The present invention relates to an access node (2) for connecting a subscriber device (1) to an IPv6-capable aggregation network (3),
and adapted to receive an upstream IPv6 packet (Ns1O; RS1O; NA1O) comprising an IPv6 address (LLIP@O) held by the subscriber device.
An access node according to the invention is further adapted to assign a new interface identifier (IDT) to the subscriber device that is unique within the scope of a L2 communication domain (6), which the subscriber device belongs to,
to substitute, within the upstream IPv6 packet, the new interface identifier for an original interface identifier (IDO) of the IPv6 address, thereby yielding a translated upstream IPv6 packet (Ns1T; Rs1T; NA1T) comprising a translated IPv6 address (LLIP@T), and
to forward the translated upstream IPv6 packet towards the aggregation network.
The present invention also relates to a method for connecting a subscriber device to an IPv6-capable aggregation network.

12 Claims, 4 Drawing Sheets

Figure 1:
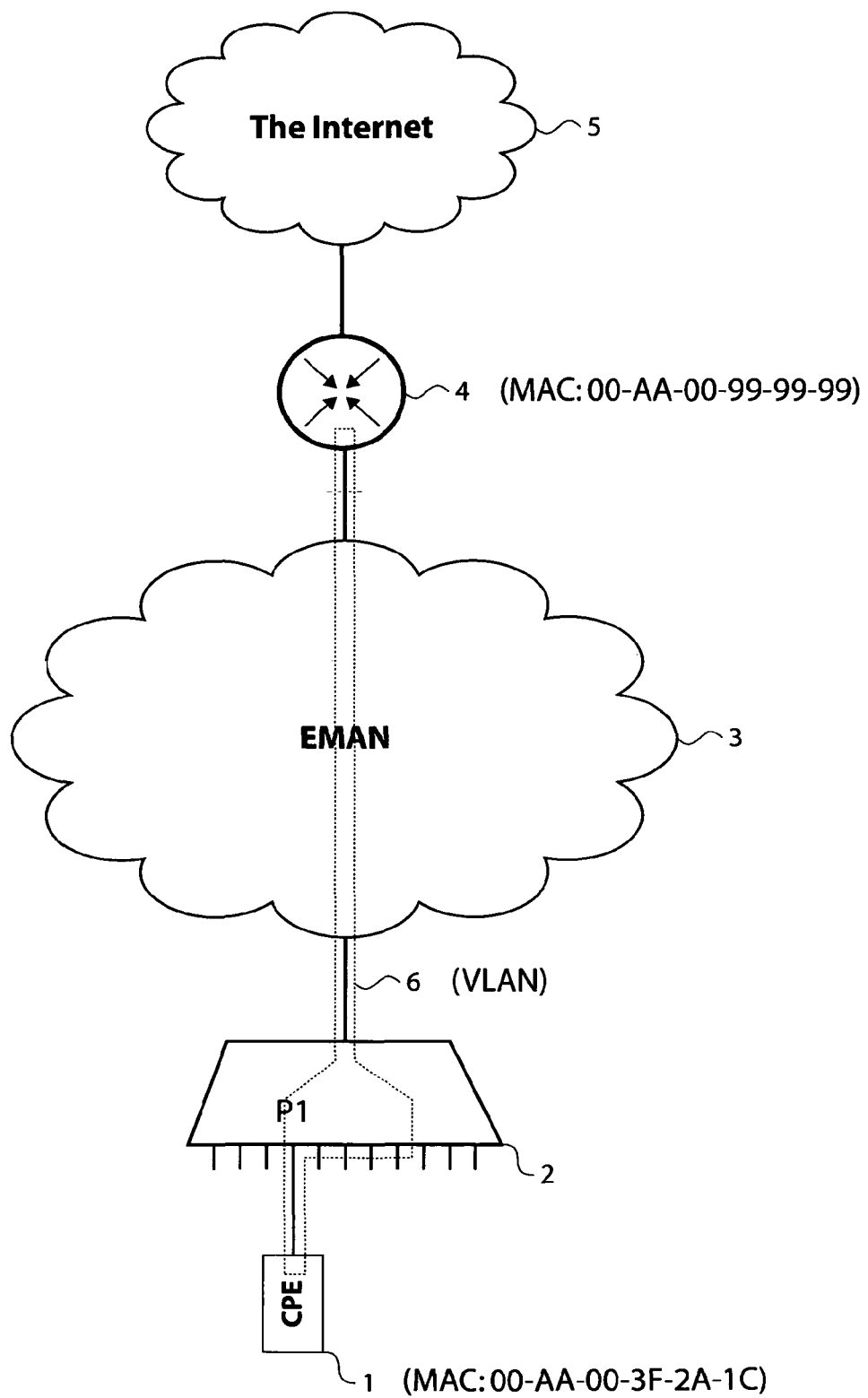

METHOD AND APPARATUS FOR CONNECTING SUBSCRIBER DEVICES TO AN IPV6-CAPABLE AGGREGATION NETWORK

The present invention relates to an access node for connecting a subscriber device to an IPv6-capable aggregation network.

Internet Protocol version 6 (IPv6) is the next generation protocol designed by the Internet Engineering Task Force (IETF) to replace the current version of Internet Protocol (IPv4). IPv6 uses 128-bit network addresses, where IPv4 uses only 32 bits, thereby yielding a much larger address space with $2^{128}$ addresses available.

A new stateless auto-configuration process has been defined for allocating IPv6 addresses and delivering configuration parameters to dynamically configured hosts. The IPv6 stateless auto-configuration process requires no manual configuration of hosts, minimal (if any) configuration of routers, and no additional servers. The IPv6 stateless auto-configuration mechanism is built upon Internet control Message Protocol version 6 (ICMPv6).

The stateless auto-configuration mechanism allows a host to generate its own network addresses using a combination of locally available information and information advertised by routers. Routers advertise network prefix(es) that identify the subnet(s) associated with a link, while hosts generate an interface identifier that uniquely identifies an interface on a subnet. The interface identifier is assigned by a host using a variety of techniques (e.g., a random value, or a function of the interface's hardware address). An IPv6 global address is formed by combining the network prefix with the interface identifier.

IPv6 employs two types of network addresses: link-local addresses and global addresses.

Link-local addresses are addresses having local scope only, and that can be used to reach neighboring nodes attached to the same link. A link is herein to be construed as a L2 communication domain, that is to say a communication facility or medium over which nodes can communicate at the link-layer (L2), such as a direct/bridged Local Area network (LAN), a virtual Local Area Network (vLAN), etc. For link-local addresses, the network prefix is set to FE80::/64 (meaning the first 64 bits are set to the hexadecimal value FE 80 00 00 00 00 00 00).

Global addresses are addresses that have unlimited scope, that are route-able and that can be publicly used over the Internet.

The stateless auto-configuration process includes generating a link-local address at least for allowing peer-to-peer L2 communication, generating global address(es) from router-advertised prefix(es), and verifying the uniqueness of the addresses on a link by means of Duplicate Address Detection.

In addition, Dynamic Host configuration Protocol for IPv6 (DHCPv6) enables DHCP servers to pass configuration parameters such as IPv6 network addresses to hosts. It offers the capability of automatic allocation of reusable network addresses and additional configuration flexibility. This protocol is a stateful counterpart to the stateless auto-configuration process, and can be used separately or concurrently with the latter.

When supporting IP services over an Ethernet-based access/aggregation network, such as an Ethernet metropolitan Area Network (EMAN), care is needed to ensure the overall connectivity model is secure.

Support for IPv4 services over an Ethernet-based aggregation network has been defined in Broadband Forum Technical Report 101.

This document defines several new functions to be supported in access nodes in order to protect against malicious users that spoof their medium Access control (MAC) address and/or their IP address.

Similarly, when migrating from IPv4 to IPv6, care is needed to ensure the overall IPv6 connectivity model is secure.

Given that the interface identifier is not operator-controlled, it cannot generally be assumed/trusted to be unique. specifically, when placing several access nodes in the same shared VLAN, having non-unique interface identifiers can become an issue.

At this point, the only model which is proven to be secure is to make use of a 1:1 VLAN mapping (known as the "VLAN cross-connect" model). In such a model, each access port is assigned a different VLAN. This effectively shields different subscribers on the same access node from each other.

Although a proven solution, several operators today employ a N:1 VLAN mapping (known as the "Intelligent Bridge" model). When migrating these customers from IPv4 to IPv6, it may not be acceptable to migrate them towards 1:1 VLAN schemes. Therefore, a solution is required for N:1 VLAN schemes as well.

For global addresses, the problem of having duplicate interface identifiers can be overcome by advertising a different network prefix to each subscriber. Of course this requires uniquely identifying each customer during the address assignment process. This can be solved by e.g. adding a DSL line identifier to ICMPv6 or DHCPv6 messages.

Yet, for link-local addresses, there is still a need for a solution to avoid duplicate link-local addresses.

It is an object of the present invention to achieve the same level of security for IPv6 services over Ethernet access, as with present IPv4 services.

The objective of the present invention is achieved and the aforementioned shortcomings of the prior art are overcome by an access node for connecting a subscriber device to an IPv6-capable aggregation network,
and adapted to receive an upstream IPv6 packet comprising an IPv6 address held by said subscriber device,
to assign a new interface identifier to said subscriber device that is unique within the scope of a L2 communication domain, which said subscriber device belongs to,
to substitute, within said upstream IPv6 packet, said new interface identifier for an original interface identifier of said IPv6 address, thereby yielding a translated upstream IPv6 packet comprising a translated IPv6 address, and
to forward said translated upstream IPv6 packet towards said aggregation network.

The access node is responsible for translating the IPv6 link-local addresses in such a way that the 64-bit interface identifier becomes unique within the shared VLAN. This is achieved by maintaining a translation table which holds one-to-one mapping between the host's original interface identifier and the operator assigned interface identifier.

An access node according to the invention creates a secure IPv6 connectivity model in case several subscribers are sharing the same VLAN. It does so without impacting the behavior of the host, aggregation switches or broadband network gateway.

The invention may also be extended to global-unicast addresses in case the same network prefix would be shared across multiple subscribers in the same VLAN (e.g., by sending a Router Advertisement with a single Prefix to all hosts on the N:1 VLAN).

As an exemplary embodiment, the translated IPv6 address is a source IPv6 address of the upstream IPv6 packet, or is a target IPv6 address of a Neighbor Solicitation NS message or a Neighbor Advertisement NA message.

So, in order to perform the translation process correctly, the access node needs to support a number of signaling agents that change the host's interface identifier in link-local addresses placed in payloads of signaling messages. Specifically, the access node needs an ICMPv6 agent and/or a DHCPv6 agent.

A further embodiment of an access node according to the invention is further adapted to receive a downstream IPv6 packet comprising said translated IPv6 address,
to substitute, within said downstream IPv6 packet, said original interface identifier for said new interface identifier of said translated IPv6 address, thereby yielding a translated downstream IPv6 packet comprising said IPv6 address, and
to forward said translated downstream IPv6 packet towards said subscriber device.

If a reply to the first message is expected, or if downstream communication is initiated from the network side, the access node performs a table lookup and translates the new interface identifier back to its original value before forwarding the message to the subscriber device.

As an exemplary embodiment, the translated IPv6 address is a destination IPv6 address of the downstream IPv6 packet, or is a target IPv6 address of a Neighbor Solicitation NS message.

In addition, this approach also enables identifying IPv6 addresses that have a translated interface identifier. This could be useful to avoid traffic between access nodes: the access node simply installs a filter that rejects IPv6 packets with an interface identifier that was added by another access node (by looking at the specific structure of the interface identifier, and by identifying it as being a translated interface identifier). This solves a potential scalability issue when receiving thousands of Neighbor Advertisement NA or Neighbor solicitation NS messages from many access nodes in the same VLAN.

An exemplary embodiment of an access node according to the invention is a Digital subscriber Line Access Multiplexer (DSLAM), being located at a central office or at a remote location closer to subscriber premises, or an optical Line Termination (OLT), or a wireless/mobile base station, or an Ethernet access bridge.

The present invention also relates to a method for connecting a subscriber device to an Internet Protocol version 6 IPv6-capable aggregation network.

A method according to the invention comprises the steps of receiving an upstream IPv6 packet comprising an IPv6 address held by said subscriber device,
assigning a new interface identifier to said subscriber device that is unique within the scope of a L2 communication domain, which said subscriber device belongs to,
substituting, within said upstream IPv6 packet, said new interface identifier for an original interface identifier of said IPv6 address, thereby yielding a translated upstream IPv6 packet comprising a translated IPv6 address, and
forwarding said translated upstream IPv6 packet towards said aggregation network.

Embodiments of a method according to the invention correspond with the embodiments of an access node according to the invention.

Figure 2A:
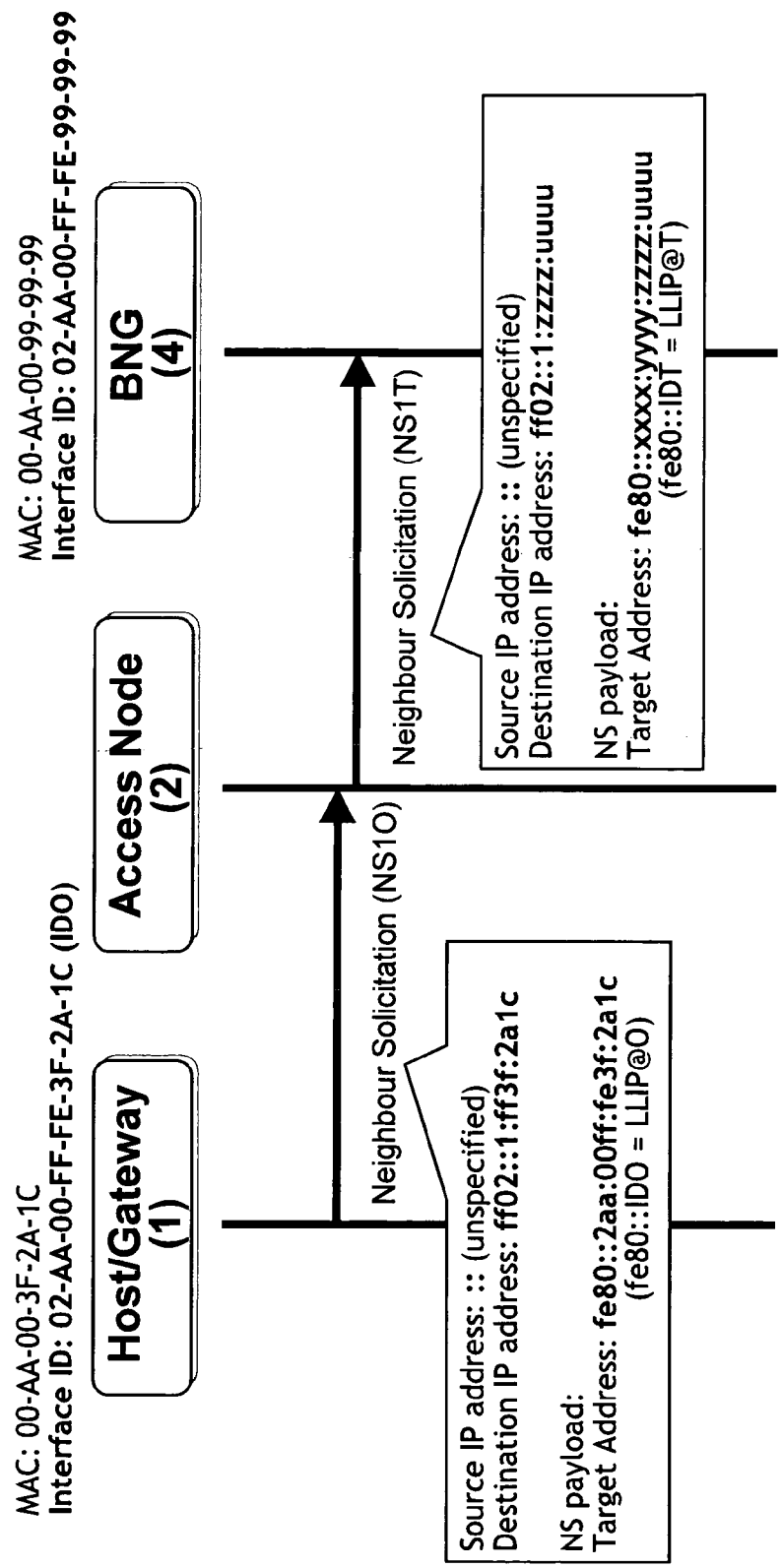
Figure 2B:
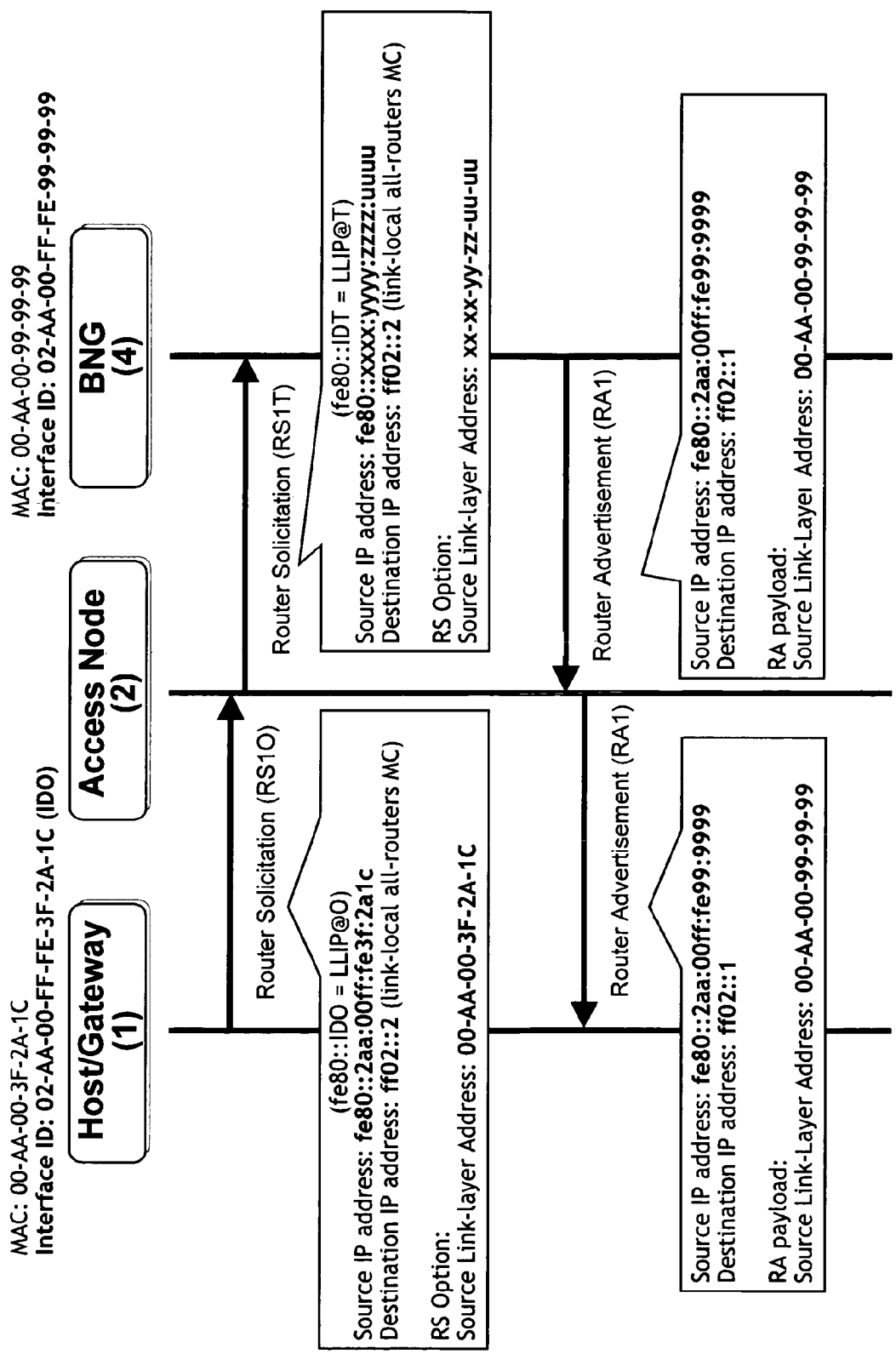
Figure 2C:
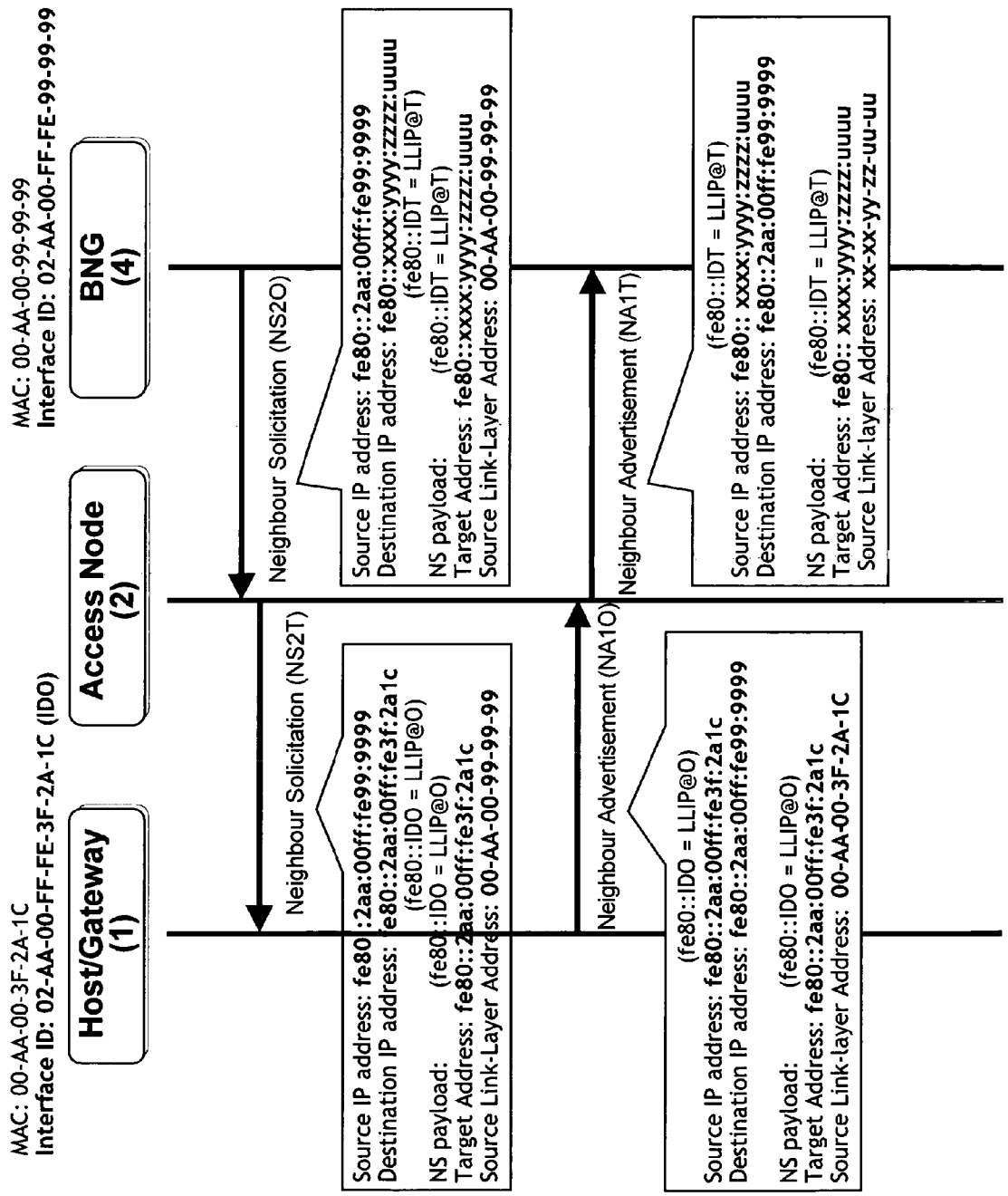

The above and other objects and features of the invention will become more apparent and the invention itself will be best understood by referring to the following description of an embodiment taken in conjunction with the accompanying drawings wherein:

FIG. 1 represents a data communication system,
FIG. 2A represents IPv6 address substitution for Duplicate Address Detection,
FIG. 2B represents IPv6 address substitution for Router Discovery,
FIG. 2C represents IPv6 address substitution for Neighbor Discovery.

There is seen in FIG. 1 a data communication system comprising an IPv6 capable subscriber device 1, an access node 2, an Ethernet-based aggregation network 3 (EMAN), an IPv6 capable edge router 4, and the Internet 5.

The subscriber device 1 is coupled to the access node 2 through a subscriber copper loop, or an optical fiber, or the air. The access node 2 and the edge router 4 are coupled to the EMAN 3. The edge router 4 is further coupled to the Internet 5.

The subscriber device 1 and the edge router 4 form part of a VLAN 6 shared with further subscriber devices (not shown) coupled to the same access node 2 and/or to further access nodes (not shown).

Downstream communication refers to communication towards the subscriber device 1, and upstream communication refers to communication from the subscriber device 1.

As an illustrative embodiment, the interface connecting the subscriber device 1 to the access node 2 is assigned the MAC address 00-AA-00-3F-2A-1C, and the interface connecting the edge router 4 to the EMAN 3 is assigned the MAC address 00-AA-00-99-99-99.

The subscriber device 1 is for instance a gateway, a router, a personal computer, a mobile/wireless terminal, etc.

In a preferred embodiment, the access node 2 stands for a Digital Subscriber Line Access Multiplexer (DSLAM). Alternatively, the access node 2 could be an optical Line Termination (OLT), a 3G/LTE node B, a Wimax/Wifi base station, an Ethernet access bridge, etc.

The access node 2 is adapted to translate link-local IPv6 addresses according to the present invention, and more specifically, for upstream IPv6 packets entering the EMAN 3, to translate the interface identifier of an IPv6 address as autonomously built by the subscriber device 1 into another unique trusted/certified interface identifier, and vice-versa for downstream IPv6 packets leaving the EMAN 3. The access node 2 accommodates an Ethernet switch (or an emulation thereof) for forwarding Ethernet frames and for intercepting ICMPv6 packets, an ICMPv6 agent for decoding ICMPv6 packets and for translating a source, destination, or target IPv6 address thereof, and a local data repository wherein original interface identifiers, trusted interface identifiers and subscriber port identifiers are held in one-to-one relationships.

The access node 2 further accommodates line termination cards with subscriber ports to connect to subscriber devices, and one or more network termination card to connect to the EMAN 3. The subscriber port through which the subscriber device 1 is coupled is denoted as P1.

An operation of the access node 2 now follows with reference to FIGS. 2A, 2B and 2C.

Nodes (both hosts and routers) begin the auto-configuration process by generating a link-local address for the interface. A link-local address is formed by appending an identifier of the interface to the well-known link-local prefix.

Before the link-local address can be assigned to an interface and used, however, a node must attempt to verify that this "tentative" address is not already in use by another node on the link, specifically, it sends a Neighbor solicitation message containing the tentative address as the target. If another node is already using that address, it will return a Neighbor Advertisement saying so. If another node is also attempting to use the same address, it will send a Neighbor solicitation for the target address as well. The exact number of times the Neighbor solicitation is (re)transmitted and the delay time between consecutive solicitations is link-specific and may be set by system management.

If a node determines that its tentative link-local address is not unique, the address cannot be assigned to the interface. If the address is derived from an interface identifier, a new identifier will need to be assigned to the interface, or the interface will need to be manually configured.

Once a node ascertains that its tentative link-local address is unique, it assigns the address to the interface. At this point, the node has IP-level connectivity with neighboring nodes.

By default, all addresses should be tested for uniqueness prior to their assignment to an interface for safety. The test should individually be performed on all addresses obtained via stateless address auto-configuration or via DHCPv6.

A host may generate its link-local address (and verify its uniqueness), while at the same time waiting for a Router Advertisement.

There is seen in FIG. 2A ICMPv6 messages exchanged between the subscriber device 1 (host/gateway), the access node 2 and the edge router 4 (BNG) during Duplicate Address Detection.

The subscriber device 1 generates a link-local IPv6 address by combining the link-local network prefix FE80::/64 with an autonomously built interface identifier IDO, presently 2AA: 00FF:FE3F:2A1C, thereby yielding a link-local IPv6 address LLIP@O, presently FE80::2AA:00FF:FE3F:2A1C.

Similarly, the edge router 4 generates a link-local IPv6 address by combining the link-local network prefix FE80::/64 with an autonomously built interface identifier, presently 2AA:00FF:FE99:9999, thereby yielding another link-local IPv6 address, presently FE80::2AA:00FF:FE99:9999.

The subscriber device 1 issues a Neighbor solicitation message NS1O comprising, as source IPv6 address, the unspecified IPv6 address, and as destination IPv6 address, the solicited-node multicast IPv6 address, presently FF02::1:FF3F: 2A1C. The Neighbor solicitation message NS1O further comprises, as payload, a target IPv6 address, presently the link-local IPv6 address LLIP@O=FE80::2AA:00FF:FE3F: 2A1C held by the subscriber device 1, the uniqueness of which is to be checked. The solicited-node multicast IPv6 address is computed as a function of the target IPv6 address.

The access node 2 receives the Neighbor solicitation message NS1O, and inspects the target IPv6 address thereof. As the interface identifier IDO of this address is not registered in the local data repository, it generates a trusted and unique interface identifier IDT, presently xxxx:yyyy:zzzz:uuuu, and assigns that new interface identifier IDT to the subscriber device 1 by creating a new entry in the local data repository whereby the new interface identifier IDT, the original interface identifier IDO and the subscriber port P1 are associated.

The access node 2 then translates the target IPv6 address, presently the link-local IPv6 address LLIP@O FE80::2AA: 00FF:FE3F:2A1C, into a new target IPv6 address, presently the link-local IPv6 address LLIP@T=FE80::xxxx:yyyy: zzzz:uuuu, by substituting the new interface identifier IDT for the original interface identifier IDO within the target IPv6 address. The access nodes recomputes the new solicited-node multicast IPv6 address according to the new target IPv6 address, presently FF02::1:zzzz:uuuu.

The so-translated Neighbor solicitation message NS1T is eventually forwarded through the aggregation network 3, and within the shared VLAN 6, towards the edge router 4.

The next phase of auto-configuration involves obtaining a Router Advertisement or determining that no routers are present. If routers are present, they will send Router Advertisements that specify what sort of auto-configuration a host can do. Note that DHCPv6 service for address configuration may still be available even if no routers are present.

Routers send Router Advertisements periodically, but the delay between successive advertisements will generally be longer than a host performing auto-configuration will want to wait. To obtain an advertisement quickly, a host sends one or more Router solicitations to the all-routers multicast group.

Router Advertisements also contain zero or more Prefix Information options that contain information used by stateless address auto-configuration to generate global addresses. It should be noted that a host may use both stateless address auto-configuration and DHCPv6 simultaneously. One Prefix Information option field, the "autonomous address-configuration flag", indicates whether or not the option even applies to stateless auto-configuration. If it does, additional option fields contain a subnet prefix, together with lifetime values, indicating how long addresses created from the prefix remain preferred and valid.

Because routers generate Router Advertisements periodically, hosts will continually receive new advertisements. Hosts process the information contained in each advertisement as described above, adding to and refreshing information received in previous advertisements.

There is seen in FIG. 2B ICMPv6 messages exchanged between the subscriber device 1 (host/gateway), the access node 2 and the edge router 4 (BNG) during Router Discovery.

The subscriber device 1 issues a Router solicitation message Rs1O, comprising, as source IPv6 address, the autonomously built link-local IPv6 address LLIP@O, and as destination IPv6 address, the all-routers multicast IPv6 address FF02::2. The Router solicitation message Rs1O further comprises, as payload, a source link-layer address, presently the MAC address 00-AA-00-3F-2A-1C held by the subscriber device 1.

The access node 2 receives the Router solicitation message Rs1O, and inspects the source IPv6 address thereof. As the interface identifier of this address IDO is currently registered in the local data repository as being associated with the trusted interface identifier IDT, the access node 2 translates the source IPv6 address, presently LLIP@O=FE80::2AA: 00FF:FE3F:2A1C, into a new link-local IPv6 address, presently LLIP@T=FE80::xxxx:yyyy:zzzz:uuuu, by substituting the new interface identifier IDT for the original interface identifier IDO within the source IPv6 address. The access node 2 may also update the source link-layer address of the payload (depending on the function that is used for generating the interface identifier), presently the source link-layer address is updated to xx-xx-yy-zz-uu-uu.

The so-translated Router solicitation message RS1T is eventually forwarded through the aggregation network 3, and within the shared VLAN 6, towards the edge router 4.

The edge router 4 answers the Router solicitation message RS1T with a Router Advertisement message RA1, which comprises the network prefix(es) to use for global address(es), as well as further configuration parameters. The Router Advertisement message RA1 comprises, as source IPv6 address, a link-local IPv6 address as autonomously built by the edge router 2, presently FE80::2AA:00FF:FE99:9999, and as destination IPv6 address, the all-nodes multicast IPv6 address FF02::1. The Router Advertisement message RA1 further comprises, as payload, the source link-layer address of the edge router 4, presently the MAC address 00-AA-00-99-99-99, global network prefix(es) to be used, and further configuration parameters, such as the Maximum Transmission Unit (MTU) of the link, etc (not shown).

The access node 2 does not translate the Router Advertisement message RA1 as the interface identifier as autonomously built by the edge router 4 is trusted.

The access node 2 broadcasts the Router Advertisement message RA1 towards all the subscriber devices that form part of the shared VLAN 6, including the subscriber device 1.

The edge router 4 may also reply with a unicast Router Advertisement message bound to, a specific subscriber device. In this case, the behavior for the access node 2 will be very similar to that of processing a downstream unicast Neighbor Solicitation message (see FIG. 2C), except that there will not be any target address in the RA message payload.

There is seen in FIG. 2C ICMPv6 messages exchanged between the subscriber device 1 (host/gateway), the access node 2 and the edge router 4 (BNG) during Neighbor Discovery.

The edge node 4 issues a Neighbor Solicitation message NS2O comprising, as source IPv6 address, the link-local IPv6 address of the edge router 4, presently the IPv6 address FE80::2AA:00FF:FE99:9999, and as destination IPv6 address, the translated link-local IPv6 address of the subscriber device 1, presently LLIP@T=FE80::xxxx:yyyy:zzzz:uuuu. The Neighbor Solicitation message NS1O further comprises, as target IPv6 address to be resolved, the translated link-local IPv6 address LLIP@T, and as source link-layer address, the MAC address 00-AA-00-99-99-99 of the edge node 4.

The access node 2 receives the Neighbor Solicitation message NS2O, and inspects the interface identifier of the destination and/or target IPv6 address thereof. As this interface identifier is currently registered in the local data repository as a translated interface identifier, presently IDT=xxxx:yyyy:zzzz:uuuu, associated with an original interface identifier and a subscriber port, presently ID0=2AA:00FF:FE3F:2A1C and P1, the access node 2 translates the destination and target IPv6 address of the Neighbor Solicitation message NS2O, presently LLIP@T=FE80::xxxx:yyyy:zzzz:uuuu, back into the original link-local IPv6 address of the subscriber device 1, presently LLIP@O=FE80::2AA:00FF:FE3F:2A1C, by substituting the original interface identifier IDO for the translated interface identifier IDT.

The so-translated Neighbor Solicitation message NS2T is eventually forwarded through the subscriber port associated with the translated/original interface identifier, presently the Neighbor Solicitation message NS2T is forwarded through the subscriber port P1 towards the subscriber device 1.

The subscriber device 1 answers the Neighbor Solicitation message NS2T by issuing a Neighbor Advertisement message NA1O.

The Neighbor Advertisement message NA1O comprises, as source IPv6 address, the link-local IPv6 address of the subscriber device 1, presently LLIP@O FE80::2AA:00FF:FE3F:2A1C, and as destination IPv6 address, the link-local IPv6 address of the edge router 4, presently the IPv6 address FE80::2AA:00FF:FE99:9999. The Neighbor Advertisement message NA1O further comprises, as target IPv6 address, the original link-local IPv6 address LLIP@O, and as associated link-layer address, the MAC address 00-AA-00-3F-2A-1C of the subscriber device 1.

The access node 2 receives the Neighbor Advertisement message NA1O, and inspects the interface identifier of the source and/or target IPv6 address thereof. As this interface identifier is currently registered in the local data repository as an original interface identifier, presently ID0=2AA:00FF:FE3F:2A1c, associated with a trusted interface identifier, presently IDT=xxxx:yyyy:zzzz:uuuu, the access node 2 translates the source and target IPv6 address of the Neighbor Advertisement message NA1O, presently LLIP@O=FE80::2AA:00FF:FE3F:2A1C, into the trusted link-local IPv6 address assigned to the subscriber device 1, presently LLIP@T=FE80::xxxx:yyyy:zzzz:uuuu, by substituting the new interface identifier IDT for the original interface identifier IDO.

The so-translated Neighbor Advertisement message NA1T is eventually forwarded through the EMAN 3, and within the shared VLAN 6, towards the edge router 4.

The subscriber device 1 may also perform DHCPv6 signaling to obtain an IPv6 address and/or additional configuration parameters. In this case, a DHCPv6 agent in the access node 2 intercepts DHCPv6 messages and translates any interface identifiers in the DHCPv6 message payload to conform to the operator assigned interface identifier. In downstream, the same process will be performed such that the host will not be aware of the translation process happening.

In order to avoid the translation table from become too large, a mechanism is put in place that removes entries that have get staled. This could be achieved by linking the table entries to the corresponding MAC aging timer, or to the corresponding DHCPv6 lease time.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A communication system comprising:
   an access node device for connecting a subscriber device to an Internet Protocol version 6 IPv6-capable aggregation network, the access node device configured to,
   receive an upstream IPv6 packet comprising an IPv6 address held by said subscriber device,
   assign a new interface identifier (IDT) to said subscriber device that is unique within the scope of a Layer 2 (L2) communication domain, which said subscriber device belongs to, remove an original interface identifier of said IPv6 address, insert, within said upstream IPv6 packet, said new interface identifier for the removed original interface identifier, thereby yielding a translated upstream IPv6 packet comprising a translated IPv6 address, and forward said translated upstream IPv6 packet towards said aggregation network.

2. The communication system according to claim 1, wherein said IPv6 address is a link-local IPv6 address.

3. The communication system according to claim 1, wherein said IPv6 address is a global IPv6 address.

4. The communication system according to claim 1, wherein said IPv6 address is a source IPv6 address of said upstream IPv6 packet.

5. The communication system according to claim 1, wherein said upstream IPv6 packet is at least one of a Neighbor Solicitation NS message and a Neighbor Advertisement NA message with said IPv6 address as a target IPv6 address.

6. The communication system according to claim 1, wherein said access node is further configured to, receive a downstream IPv6 packet comprising said translated IPv6 address, substitute, within said downstream IPv6 packet, said original interface identifier for said new interface identifier of said translated IPv6 address, thereby yielding a translated downstream IPv6 packet comprising said IPv6 address, and forward said translated downstream IPv6 packet towards said subscriber device.

7. The communication system according to claim 6, wherein said translated IPv6 address is a destination IPv6 address of said downstream IPv6 packet.

8. The communications system according to claim 6, wherein said downstream IPv6 packet is a Neighbor Solicitation NS message with said translated IPv6 address as a target IPv6 address.

9. The communication system according to claim 6, wherein said access node is a Digital Subscriber Line Access Multiplexer DSLAM.

10. The communication system according to claim 6, wherein said access node is an Optical Line Termination OLT.

11. The communication system according to claim 6, wherein said access node is a mobile/wireless base station.

12. A method for connecting a subscriber device to an Internet Protocol version 6 IPv6-capable aggregation network, comprising:

receiving an upstream IPv6 packet comprising an IPv6 address held by said subscriber device, assigning a new interface identifier to said subscriber device that is unique within the scope of a Layer 2 L2 communication domain, which said subscriber device belongs to, removing an original interface identifier of said IPv6 address, inserting, within said upstream IPv6 packet, said new interface identifier for the removed original interface identifier, thereby yielding a translated upstream IPv6 packet comprising a translated IPv6 address, and forwarding said translated upstream IPv6 packet towards said aggregation network.

* * * * *